United States Patent [19]

Leddet

[11] Patent Number: 4,561,176
[45] Date of Patent: Dec. 31, 1985

[54] SIX-AXIS HEAD FOR CORRECTION OF MOVEMENTS

[75] Inventor: Philippe Leddet, Croissy sur Seine, France

[73] Assignee: Regie Nationale des Usines Renault, Boulogne-Billancourt, France

[21] Appl. No.: 685,773

[22] Filed: Dec. 24, 1984

[30] Foreign Application Priority Data

Dec. 23, 1983 [FR] France ................................ 83 20655

[51] Int. Cl.$^4$ ...................... B23P 21/00; B23Q 15/00; B25J 11/00; B25J 15/06
[52] U.S. Cl. ........................................ 29/709; 29/822; 29/712; 414/744 B; 414/752; 414/757; 901/16; 901/30; 901/40; 901/46
[58] Field of Search ................. 29/709, 822, 823, 824, 29/712; 414/744 A, 744 B, 752, 757; 901/9, 16, 22, 23, 30, 40, 41, 46, 47; 156/102

[56] References Cited

U.S. PATENT DOCUMENTS

| | | | |
|---|---|---|---|
| 3,418,099 | 12/1968 | Carter et al. | 414/752 X |
| 3,637,092 | 1/1972 | George et al. | 901/22 X |
| 3,665,148 | 5/1972 | Yasenchak et al. | 901/16 X |
| 3,960,276 | 6/1976 | Gerhardt | 414/752 X |
| 4,368,087 | 1/1983 | Valimont et al. | 156/102 |

FOREIGN PATENT DOCUMENTS 2510933 2/1983 France .................................. 29/709

Primary Examiner—Howard N. Goldberg
Assistant Examiner—Ronald S. Wallace
Attorney, Agent, or Firm—Oblon, Fisher, Spivak, McClelland & Maier

[57] ABSTRACT

This invention has as its object a six-axis head for correction of movements equipping a mobile tool (12) for mating assembly of an element on a support. The head comprises an upper frame (10) fastened to the mobile assembly tool defining a first geometric plane $P_1$, an intermediate frame (16) defining a second geometric plane $P_2$ and connected to the upper frame (10) by first drive means ($M_1$, $M_2$, $M_3$) making it possible to perform two translations and a rotation of plane $P_2$ in relation to plane $P_1$, a lower frame (18) defining a third geometric plane $P_3$ and connected to the intermediate frame (16) by second drive means ($M_4$, $M_5$, $M_6$) making it possible to perform a translation and two rotations of plane $P_3$ in relation to plane $P_2$, means (20) for holding the element being fastened to the lower frame (18). It has application in automated placing of glazing elements (windscreens) on a motor vehicle body.

8 Claims, 7 Drawing Figures

SIX-AXIS HEAD FOR CORRECTION OF MOVEMENTS

This invention has particularly as its object making possible the mating assembly of an element on a support thanks to a mobile tool equipped, on the one hand, with means for holding the element and, on the other hand, with sensors detecting the proximity of the support and delivering control signals to means for driving the mobile assembly tool to position it correctly in relation to the support. Such a mobile assembly tool has already been described in French patent application No. 81/15,266 published under U.S. Pat. No. 2,510,933. This document describes and shows a tool to perform the automatic placing of a glazing element on a vehicle body with a good precision of the location in space of the loading point and the point of placing the glazing element.

However, it has been found that the assembly precision obtained by this placing tool is not sufficient in certain applications and particularly in the case of placing of glazing elements which are glued to the body and which require a very great precision in the positioning in relation to the body, the glazing element no longer being received in a peripheral gasket absorbing the divergences.

The particular problem relating to placing of glued glazing elements which has just been mentioned has led the applicant to develop a head for correction of movements which can be mounted on the end of a mobile placing tool such as, for example, a robot or automaton arm that makes possible the mating assembly of an element on a support with the greatest possible precision.

For this purpose, the invention proposes a six-axis head for correction of movements equipping a mobile tool for mating assembly of an element on a support equipped, on the one hand, with means for holding the element and, on the other hand, with sensors detecting the proximity of the support and delivering control signals to the means for driving the mobile assembly tool to position it correctly in relation to the support, characterized in that it comprises an upper frame fastened to the mobile assembly tool defining a first geometric plane $P_1$, an intermediate frame defining a second geometric plane $P_2$ and connected to the upper frame by first drive means making it possible to make two translations $T_{X1}$, $T_{Y2}$ of plane $P_2$ parallel to plane $P_1$ along two orthogonal axes $O_{X1}$, $O_{Y1}$ of plane $P_1$ and a rotation $R_{Z1}$ of plane $P_2$ around an axis $O_{Z1}$ orthogonal to plane $P_1$, a lower frame defining a third geometric plane $P_3$ and connected to the intermediate frame by second drive means making it possible to make a translation $T_{Z2}$ of plane $P_3$ in relation to plane $P_2$ along an axis $O_{Z2}$ orthogonal to plane $P_2$ and two rotations $R_{X2}$, $R_{Y2}$ of plane $P_3$ around two orthogonal axes $O_{X2}$, $O_{Y2}$ of plane $P_2$, the means for holding the element being fastened to the lower frame, said signals delivered by the proximity sensors also being delivered to the means for controlling the first and second drive means.

It is understood that thanks to this structure of the head for correction of movements, it is possible to make a very precise correction of the position of the element in relation to the support that is going to receive it by breaking down the correction movements along three axes of translation and three axes of rotation so as to correct the transversal positioning error along three orthogonal axes and the error in rotation around these three axes.

According to another characteristic of the invention, the first drive means consist of three mechanisms each comprising a round eccentric mounted on the upper frame, driven in rotation by a drive shaft orthogonal to plane $P_1$ offset in relation to the center of the eccentric and received in an oblong opening formed in the intermediate frame and delimited by two parallel rectilinear portions, the three drive shafts being mounted at the vertices of a triangle, two of said oblong openings being parallel to one another and the third oblong opening being orthogonal to their common direction, the rotation of each of the three drive shafts being able to be controlled selectively to perform said translations $T_{X1}$, $T_{Y1}$ and said rotation $R_{Z1}$ of plane $P_2$ in relation to plane $P_1$.

The six-axis head for correction of movements further comprises means for guiding and connecting of the intermediate frame in relation to the upper frame, assuring constant parallelism of planes $P_1$ and $P_2$.

According to another characteristic of the invention, the second drive means consist of three double-action jacks arranged in a triangle each of which comprises a body fastened to the intermediate frame and a rod able to move orthogonally to plane $P_2$ and whose end is jointed on the lower frame, the actuation of each of the three jacks being able to be controlled selectively to perform said translation $T_{Z2}$ and said rotations $R_{X2}$, $R_{Y2}$ of plane $P_3$ in relation to plane $P_1$.

The structure of the head that has just been described and the drive means that it comprises makes it possible to separate the correction in two steps along six axes, a first step making it possible to perform a plane centering on the plane of plane $P_2$ in relation to plane $P_1$ thanks to the first drive means consisting of the eccentrics that can be controlled by electric motors, and a second step making it possible to make a correction along the other three axes of the position of plane $P_3$ in relation to plane $P_2$ thanks to three double-action jacks which can also be controlled electrically by three independent motors, the selective electric control of the six electric motors put into action to perform an overall correction step can be performed selectively after processing of the signals delivered by the proximity sensors and computation of the transversal and/or rotation errors.

There will now be described by way of example an embodiment of a six-axis head for correction of movements equipping a mobile tool for mating assembly of a glazing element on a motor vehicle body, a tool for whose complete description the French patent application published under U.S. Pat. No. 2,510,933 will advantageously be consulted.

For an easier understanding of the following description, reference will be made to the accompanying drawings in which.

Figure 1:
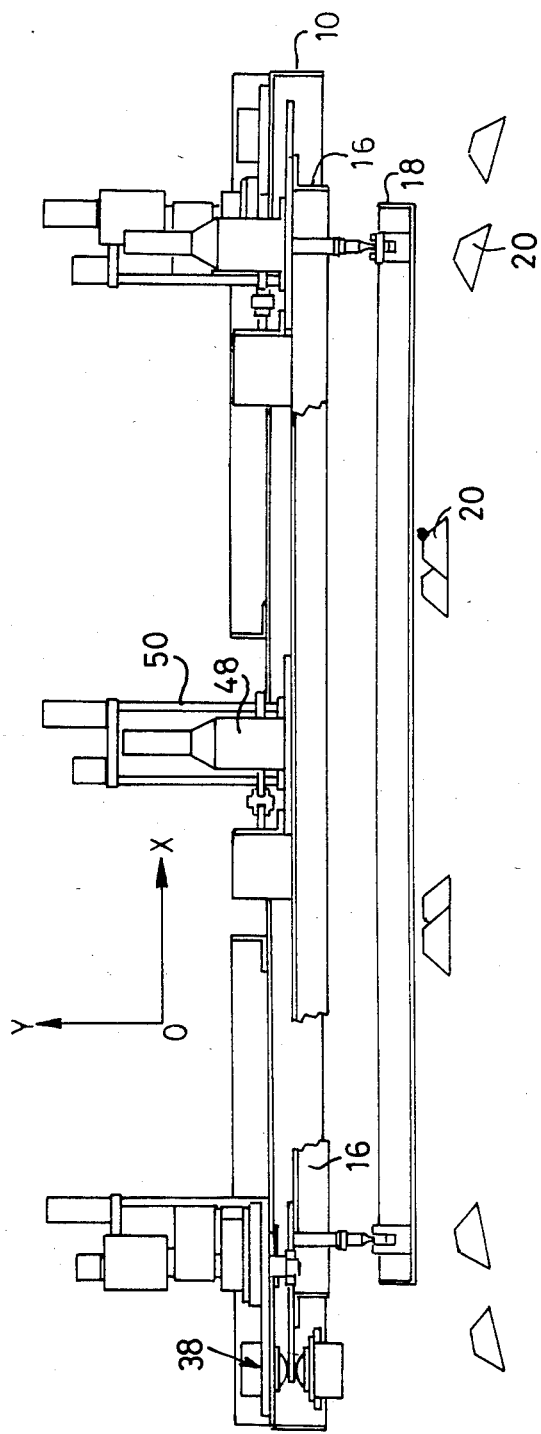
FIG. 1 is an elevation of view of a head for correction of movements embodied according to the teachings of the invention.
Figure 2:
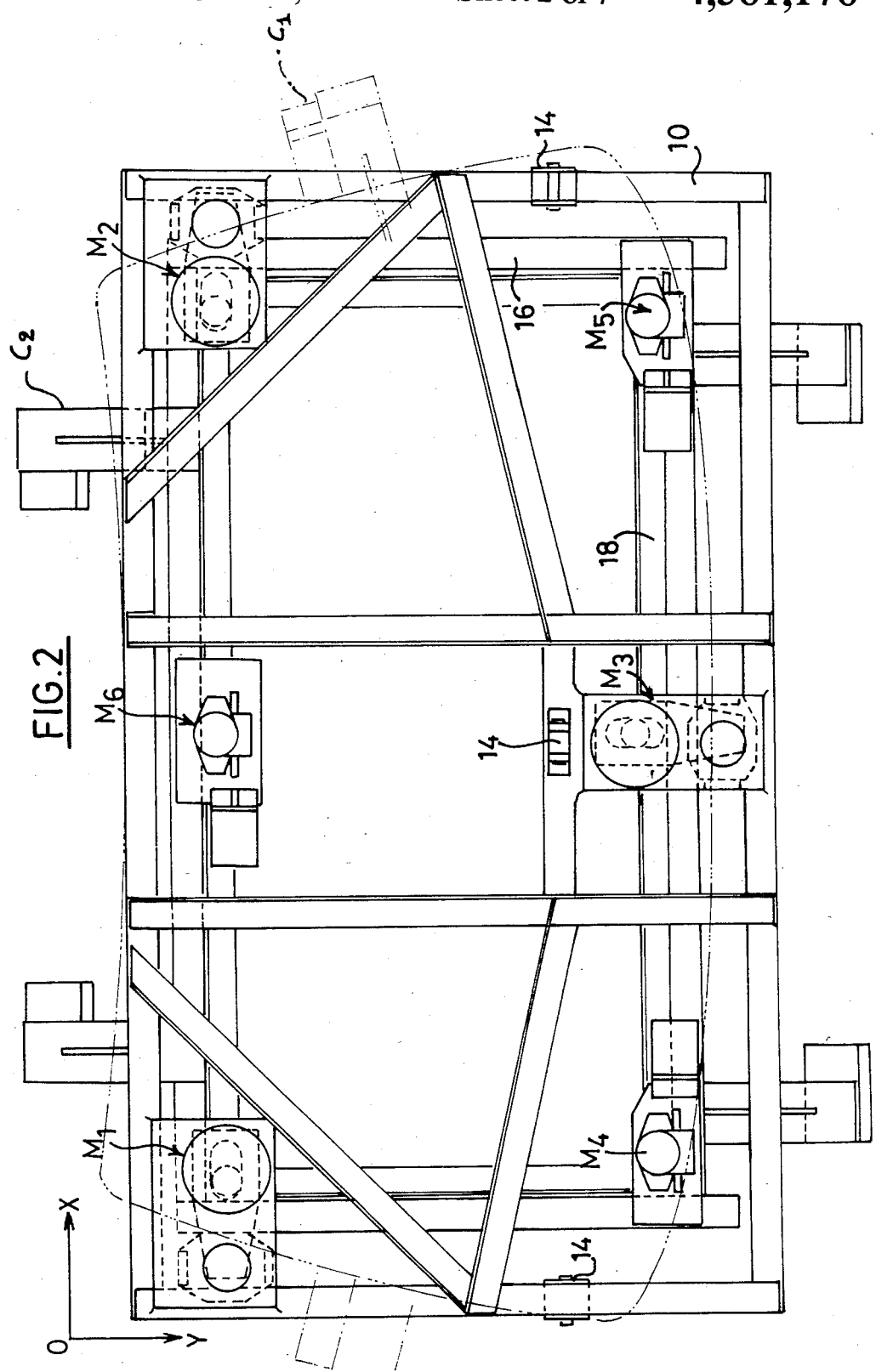
FIG. 2 is a top view of the correction head shown in FIG. 1.
Figure 6:
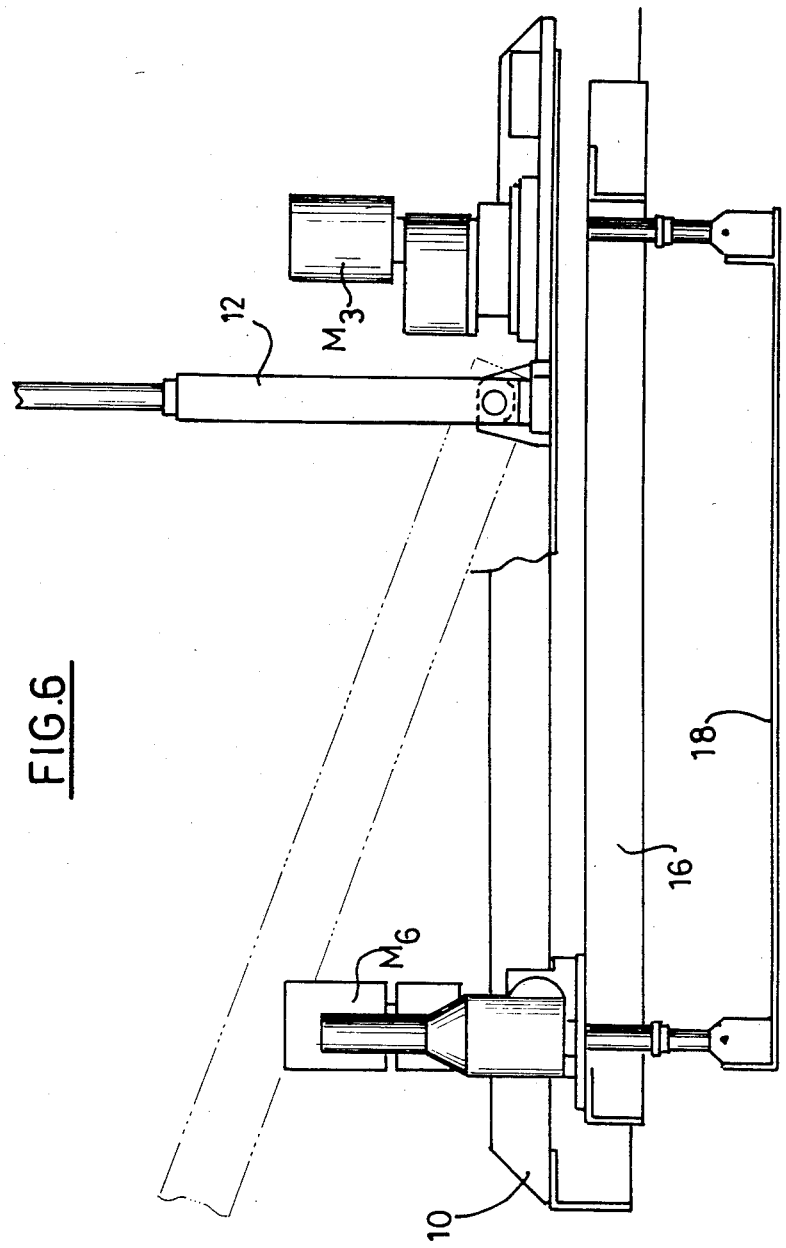
FIG. 6 is a lateral left view of the head for correction of movements of FIG. 1 shown connected to the end of a mobile placing tool.

The correction head shown particularly in FIGS. 1, 2 and 6 essentially comprises three frames. An upper frame 10 provided to be connected to the end of mobile placing tool 12 by fastening means 14. An intermediate frame 16 connected to upper frame 10. A lower frame 19 connected to intermediate frame 16 and on which are fastened the means for holding the element it is desired to place and which are shown in outline in FIG. 1 in the form of suction cups 20.

Figure 7:
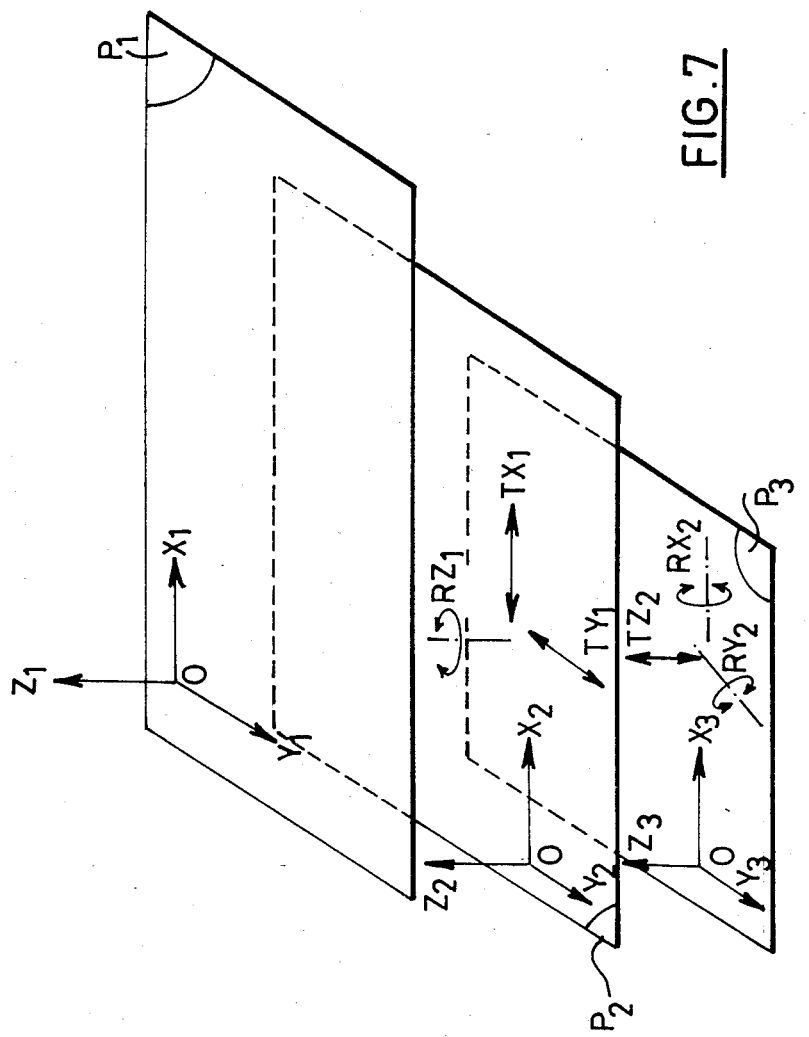
FIG. 7 is a diagram making it possible to facilitate the geometric representation in space of the respective positions of planes $P_1$, $P_2$, $P_3$ and correction movements along six axes which are obtained thanks to the correction head shown in FIGS. 1 to 6.

Each of three frames 10, 16 and 18 consists of a plane rectangular metal frame. FIG. 7 diagrammatically shows geometric planes $P_1$, $P_2$ and $P_3$ defined respectively by upper frame 10, intermediate frame 16 and lower frame 18. Each of planes $P_1$ is provided with a geometric frame of reference with three orthogonal axes $O_{Xi}$, $O_{Yi}$ and $O_{Zi}$, i varying from 1 to 3 depending on the geometric plane considered.

According to the invention, the head for correction of movements comprises first drive means $M_1$, $M_2$ and $M_3$ which make it possible to perform two translations $T_{X1}$ and $T_{Y1}$ of plane $P_2$ parallel to plane $P_1$ along two orthogonal axes $O_{X1}$ and $O_{Y1}$ of the plane $P_1$ and a rotation $R_{Z1}$ of plane $P_2$ around the orthogonal axis $O_{Z1}$ of plane $P_1$. These three correction movements therefore make it possible to perform a plane centering on the plane of plane $P_2$ in relation to plane $P_1$ during which vertical axis $O_{Z2}$ always remains parallel to vertical axis $O_{Z1}$.

Figure 3:
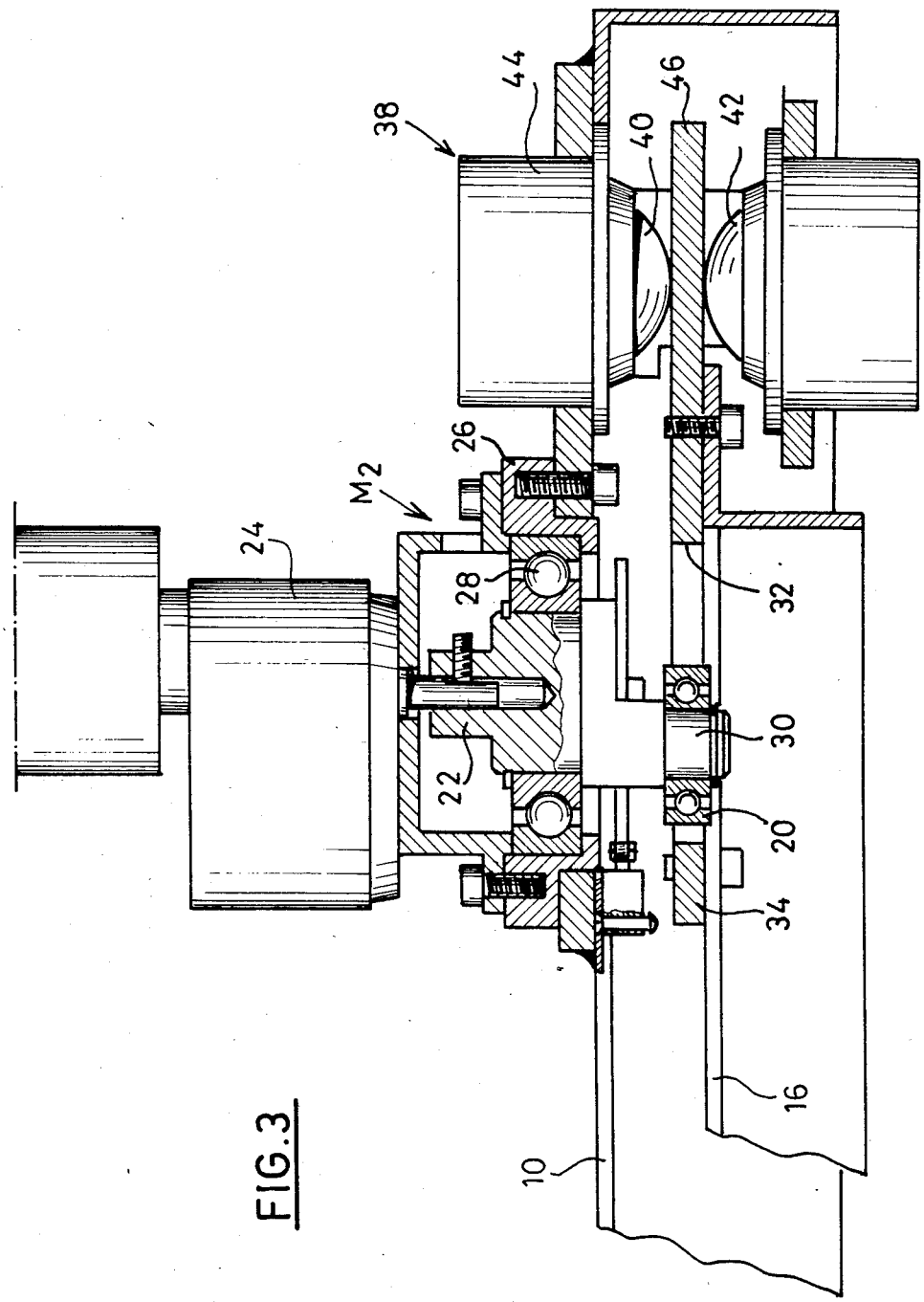
FIG. 3 is a view in partial section showing in detail one of the three eccentrics constituting the first drive means for the invention.
Figure 4:
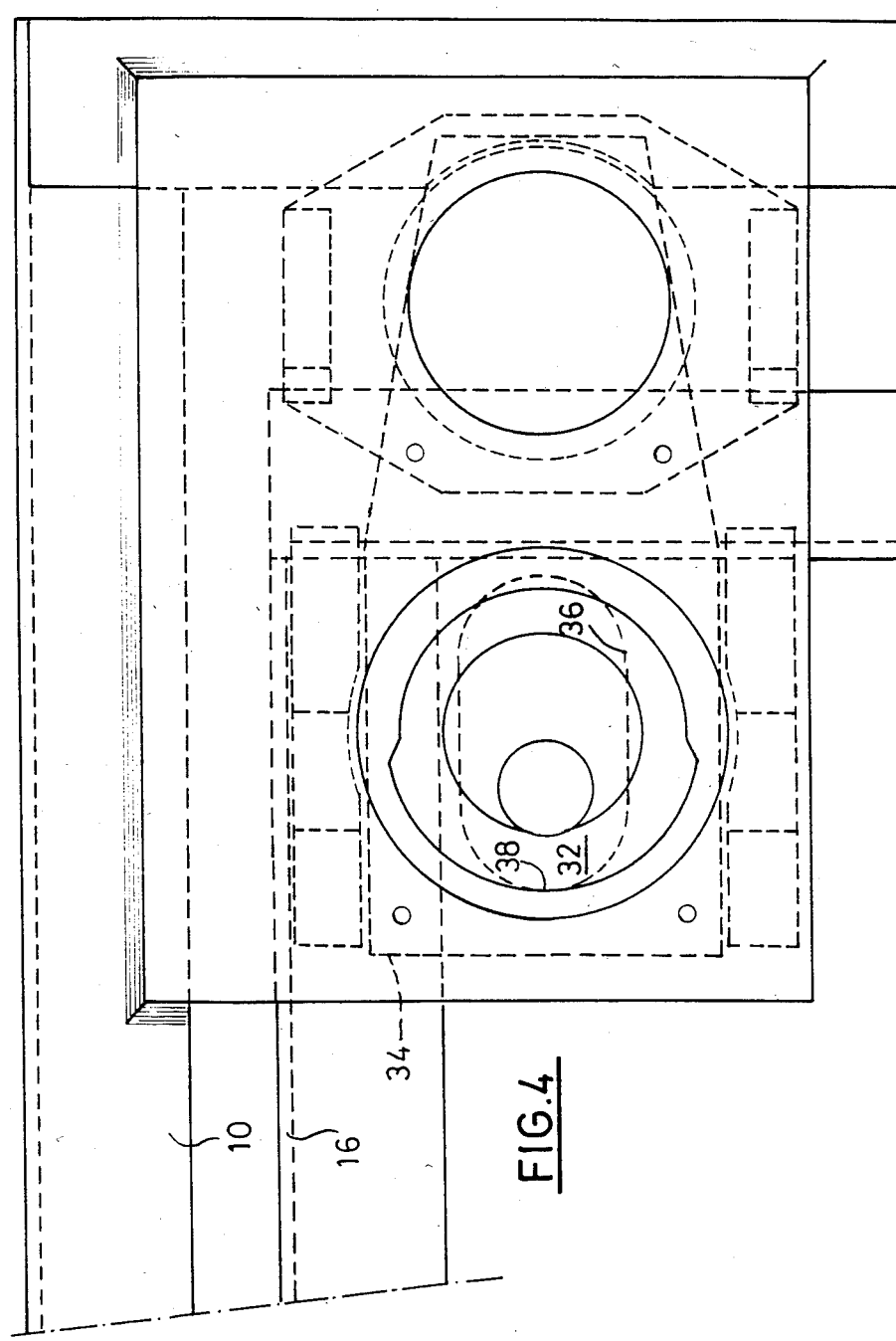
FIG. 4 is a top view in partial section of the eccentric shown in FIG. 3.

The first drive means $M_1$, $M_2$ and $M_3$ consist of three identical eccentric mechanisms, a specimen of which will be described with reference to FIGS. 3 and 4. Each drive means M comprises a round eccentric 20 driven in rotation by a drive shaft 22 offset in relation to the center of the eccentric. Drive shaft 22 is driven in rotation by a gearmotor 24 and is mounted to rotate on upper frame 10 by a flange 26 and a bearing 28. Eccentric 20 itself consists of a bearing mounted to rotate on the lower offset end 30 of drive shaft 22 and is received in an oblong opening 32 formed in a plate 34 attached to lower frame 16. Each oblong opening 32 is delimited by two parallel rectilinear portions 36 separated by a distance corresponding to the diameter of eccentric 20 and connected by two semicircular portions 38. As can be seen in FIG. 1, the three geometric axes of drive shafts 22 of each of drive means $M_1$, $M_2$ and $M_3$ are placed at the vertices of a triangle. The two oblong openings 32 of drives $M_1$ and $M_2$ are parallel to one another and, in the embodiment shown, perfectly aligned; oblong opening 32 of the third drive $M_3$ being oriented orthogonally to the common direction of oblong opening 32 of drives $M_1$ and $M_2$. Such an arrangement in triangle and with orientation of the oblong openings make it possible, by actuating only drive $M_3$, to cause a translation $T_{X1}$ of intermediate frame 16 and therefore of plane $P_2$ in relation to plane $P_1$ parallel to axis $O_{X1}$ of this latter; a simultaneous control in the same direction of rotation, i.e., for example both in the clockwise direction of drives $M_1$ and $M_2$, makes it possible to perform a translation $T_{Y1}$ of the intermediate frame in relation to the upper frame and therefore of plane $P_2$ in relation to plane $P_1$ parallel to the orthogonal axis $O_{Y1}$ of this latter. In these two translation movements which have just been described, the oblong openings of the drive or drives which are not actuated serve to guide the movements of translation obtained. It is also understood that a simultaneous actuation but in the opposite direction of the two drives $M_1$ and $M_2$ makes it possible to obtain a rotation of intermediate frame 16 in relation to upper frame 10 and therefore of plane $P_2$ in relation to plane $P_1$ around vertical orthogonal axis $O_{Z1}$ of this latter, eccentric 20 of drive $M_3$ constituting the point of rotation of the frame.

In the three correction movements that have just been described, intermediate frame 16 remains parallel to upper frame 10, plane $P_2$ therefore also remaining parallel to geometric plane $P_1$. This parallelism of the two planes $P_2$ and $P_1$ is obtained thanks to means 38 for guiding and connecting of the intermediate frame in relation to the upper frame. The guide means 38 consist of three identical pairs of bearing balls 40 and 42, each being placed close to one of the three drive means $M_1$, $M_2$ and $M_3$. As can be seen in FIG. 3, the pair of bearing balls 40, 42 is mounted on upper frame 10 in a bore 44 of this latter. A plane guide lug 46, here consisting of the extension of plate 34 in which oblong opening 32 is made, is received between the two balls 40 and 42.

It is easily understood that thanks to the three lugs 46 received to roll between the pairs of bearing balls 40, 42, intermediate frame 16 can move parallel to upper frame 10 without undesirable friction and in response to actuations of drives $M_1$, $M_2$ and $M_3$.

Figure 5:
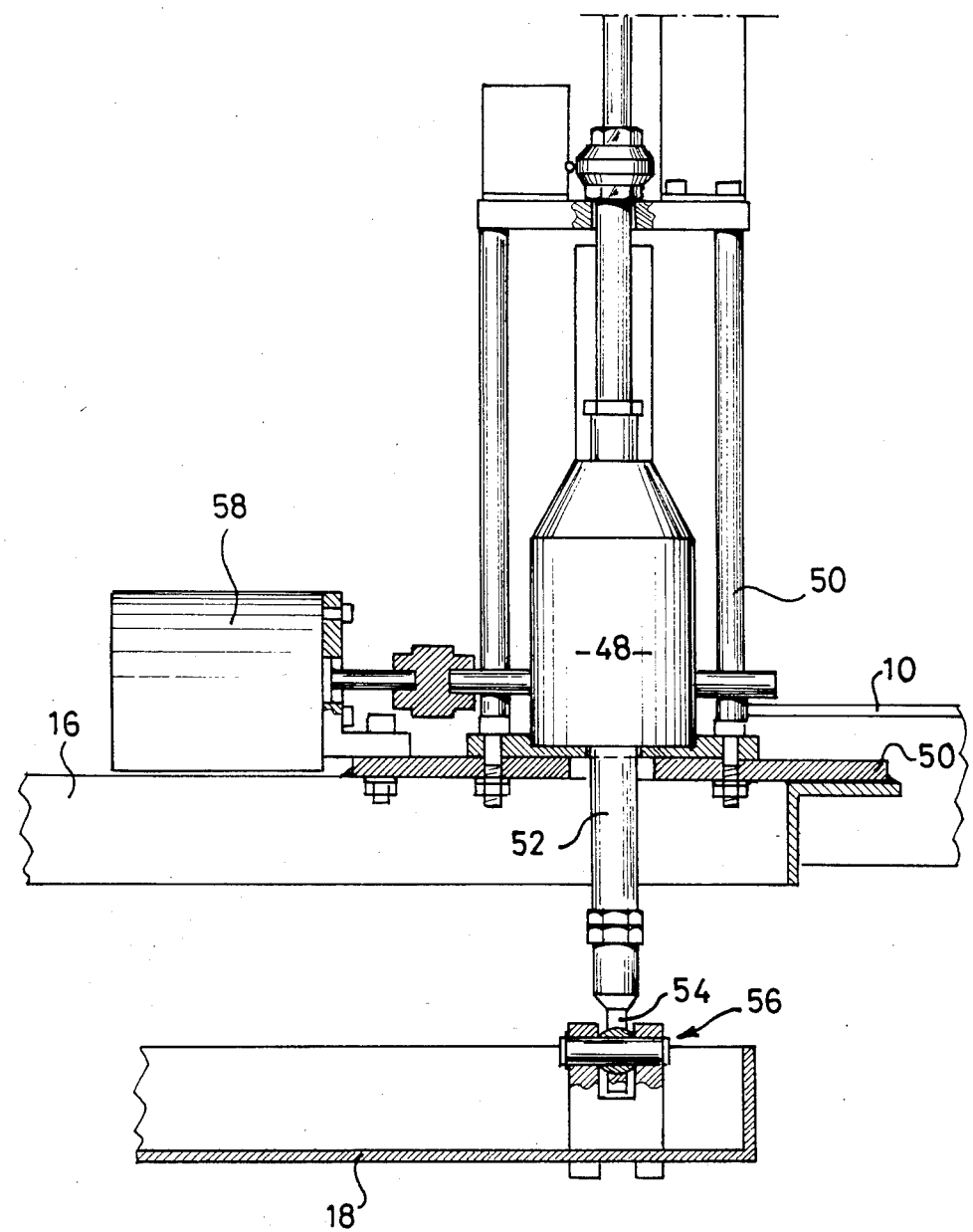
FIG. 5 is an elevation view of one of the three double-action jacks constituting the second drive means of the invention.

The second drive means of the head for correction of movements will now be described with reference to FIG. 5. The second drive means consist of three double-action jacks $M_4$, $M_5$, $M_6$, placed in a triangle on intermediate frame 16. Each of the three identical jacks $M_4$, $M_5$ and $M_6$ comprises a body 48 fastened to intermediate frame 16 by a flanging and fastening device 50. The jack also comprises a jack rod 52 whose free end 54 is jointed to lower frame 18 by a ball and socket joint 56. Each of jacks $M_4$, $M_5$ and $M_6$ is a screw jack driven by a gearmotor 58 with an angular member.

Thanks to their gearmotor 58, each of the three jacks $M_4$, $M_5$ and $M_6$ can be controlled selectively to perform, on the one hand, vertical translation $T_{Z2}$ of lower frame 18 in relation to intermediate frame 16 and therefore of plane $P_3$ in relation to plane $P_2$ by simultaneously actuating the three jacks $M_4$, $M_5$ and $M_6$ in the same direction and, on the other hand, the two rotations $R_{X2}$ and $R_{Y2}$ of plane $P_3$ in relation to plane $P_1$ around both orthogonal axes $O_{X2}$ and $O_{Y2}$ of plane $P_2$ defined by intermediate frame 16. Rotation $R_{Y2}$ can, for example, be obtained by actuating jacks $M_4$ and $M_5$ in opposite directions while rotation $R_{X2}$ can be obtained by simultaneously actuating jacks $M_4$ and $M_5$ in the same direction and jack $M_6$ in the opposite direction.

Thanks to the second drive means that have just been described it is possible to perform the second step of correction of movements around the three remaining axes during which geometric plane $P_3$ is moved in space in relation to geometric plane $P_2$ but without undergoing any transversal movement parallel to itself.

According to another characteristic of the invention, the proximity sensors equipping the mobile placing tool are fastened to the head for correction of movements and consist of a first series of sensors $C_1$ fastened to intermediate frame 16 and a second series of sensors $C_2$ fastened to lower frame 18. The sensors of the first series $C_1$ are long-range proximity sensors (about 40 mm) and the sensors of the second series are short-range proximity sensors (about 10 mm).

The six-axis head for correction of movements which has just been described also comprises means for processing the signals delivered by the proximity sensors, which are not shown and which compute the transversal positioning error of the element in relation to the support along three orthogonal axes and the error of rotation around these three axes and deliver control signals for selective control of the first and second drive means. For reasons of convenience and to limit transmission cables, the signal processing means which can comprise, for example, a programmable automaton, analog computers and relays or power amplifiers to control the gearmotors, can be grouped in a unit which is carried above the correction head itself and which moves with the mobile placing tool.

In the application that has just been described of the six-axis head for correction of movements for a tool for automatic placing of a glazing element on a motor vehicle body, the actual correction step performed by the head is performed after a first relative positioning has been obtained by the automatic placing tool and according to the process described in the French patent application No. 81/15,266 published under No. 2,510,933.

The invention that has just been described is not limited, on the one hand, to its application to assembly of a glazing element or of roof fittings on a motor vehicle body and can be adapted to any device or mobile tool thanks to which it is desired to perform a mating assembly of an element on a support; on the other hand, the structure of the correction head which has just been described can be offered in numerous variants: particularly the first drive means and the second drive means can be reversed in their arrangement, the plane adjustment on the plane can be performed between the intermediate frame and the lower frame while the adjustment in depth in space can be placed between the upper frame and intermediate frame. Also, the head unit can be turned upside down, the lower frame then being connected directly to the end of the mobile placing tool while the means for grasping the element it is desired to assemble are fastened to the upper frame.

The six-axis head for correction of movements which has just been described can also be used in automated production, an application in which it is placed between the mobile tool (consisting, for example, of the arm of a robot) and the production means such as welding tongs, machining tool, paint gun, etc.

I claim:

1. Six-axis head for correction of movements equipping a mobile tool (12) particularly for mating assembly of an element on a support equipped, on the one hand, with means (20) for holding the element and, on the other hand, with sensors ($C_1$, $C_2$) detecting the proximity of the support and delivering control signals to the means for driving the mobile assembly tool to position it correctly in relation to the support, characterized in that it comprises an upper frame (10) fastened to the mobile assembly tool defining a first geometric plane $P_1$, an intermediate frame (16) defining a second geometric plane $P_2$ and connected to the upper frame (10) by first drive means ($M_1$, $M_2$, $M_3$) making it possible to make two translations ($T_{X1}$, $T_{Y1}$) of plane $P_2$ parallel to plane $P_1$ along two orthogonal axes ($O_{X1}$, $O_{Y1}$) of plane $P_1$ and a rotation ($R_{Z1}$) of plane $P_2$ around an axis ($O_{Z1}$) orthogonal to plane $P_1$, a lower frame (18) defining a third geometric plane $P_3$ and connected to the intermediate frame (16) by second drive means ($M_4$, $M_5$, $M_6$) making it possible to make a translation ($T_{Z2}$) of plane $P_3$ in relation to plane $P_2$ along an axis ($O_{Z2}$) orthogonal to plane $P_2$ and two rotations ($R_{X2}$, $R_{Y2}$) of plane $P_3$ around two orthogonal axes ($O_{X2}$, $O_{Y2}$) of plane $P_2$, the means (20) for holding the element being fastened to the lower frame (18), said signals delivered by the proximity sensors also being delivered to the means for controlling the first and second drive means.

2. Six-axis head for correction of movements as in claim 1, wherein the proximity sensors comprise a first series of sensors ($C_1$) fastened to the intermediate frame (16) and a second series of sensors ($C_2$) fastened to the lower frame (18).

3. Six-axis head for correction of movements as in claim 2, wherein the sensors ($C_1$) of said first series are long-range proximity sensors, the sensors ($C_2$) of said second series being short-range proximity sensors.

4. Six-axis head for correction of movements as in one of claims 1 to 3, wherein said first drive means consist of three mechanisms each comprising a round eccentric (20) mounted on the upper frame, driven in rotation by a drive shaft (22) orthogonal to plane $P_1$ offset in relation to the center of the eccentric and received in an oblong opening (32) formed in the intermediate frame and delimited by two parallel rectilinear portions (36), the three drive shafts (22) being mounted at the vertices of a triangle, two of said oblong openings being parallel to one another and the third oblong opening being orthogonal to their common direction, the rotation of each of the three drive shafts being able to be controlled selectively to perform said translations ($T_{X1}$, $T_{Y1}$) and said rotation ($R_{Z1}$) of plane $P_2$ in relation to plane $P_1$.

5. Six-axis head for correction of movements as in claim 4, wherein it comprises means (38) for guiding and connecting of the intermediate frame in relation to the upper frame assuring constant parallelism of planes $P_1$ and $P_2$.

6. Six-axis head for correction of movements as in claim 5, wherein said guiding and connecting means consist of several pairs of bearing balls (40, 42) mounted on the upper frame between which are received plane guide lugs (46) fastened to the intermediate frame (16).

7. Six-axis head for correction of movements as in one of claims 1 to 3, wherein the second drive means consist of three double-action jacks ($M_4$, $M_5$, $M_6$) arranged in a triangle each of which comprises a body (48) fastened to the intermediate frame (16) and a rod (52) able to be moved orthogonally to plane $P_2$ and whose end (54) is jointed on the lower frame (18), actuation of each of the three jacks being able to be controlled selectively to perform said translation ($T_{Z2}$) and said rotations ($R_{X2}$, $R_{Y2}$) of plane $P_3$ in relation to plane $P_1$.

8. Six-axis head for correction of movements as in claim 1 or 2, wherein it comprises means for processing the signals delivered by the proximity sensors and which compute the transversal positioning error of the element in relation to the support along three orthogonal axes and the error of rotation around these three axes and delivering control signals for selective control of the first and second drive means.

* * * * *